US008130465B1

(12) United States Patent
Vanderheyden et al.

(10) Patent No.: US 8,130,465 B1
(45) Date of Patent: Mar. 6, 2012

(54) LEADER RETENTION METHOD AND DEVICE

(75) Inventors: William J. Vanderheyden, Loveland, CO (US); Phillip M. Morgan, Berthoud, CO (US)

(73) Assignee: Oracle America, Inc., Redwood City, CA (US)

( * ) Notice: Subject to any disclaimer, the term of this patent is extended or adjusted under 35 U.S.C. 154(b) by 1763 days.

(21) Appl. No.: 11/371,715

(22) Filed: Mar. 9, 2006

Related U.S. Application Data

(63) Continuation-in-part of application No. 10/844,844, filed on May 13, 2004, now Pat. No. 7,239,474.

(51) Int. Cl.
*G11B 5/027* (2006.01)
(52) U.S. Cl. .......................................... 360/85
(58) Field of Classification Search .................... 360/85, 360/94, 132, 93; 242/338.4, 348, 248.2, 242/611, 611.1
See application file for complete search history.

(56) References Cited

U.S. PATENT DOCUMENTS 4,662,049 A   5/1987   Hertrich
(Continued)

*Primary Examiner* — Allen Cao
(74) *Attorney, Agent, or Firm* — Brooks Kushman P.C.

(57) ABSTRACT

A tape drive for use with a tape cartridge having a cartridge leader includes a drive body, and a drive leader that is engageable with the cartridge leader and moveable with respect to the drive body. The tape drive further includes an engaging member that is engageable with a first portion of the drive leader and moveable with respect to the drive body for connecting the drive leader with the cartridge leader of the tape cartridge. The tape drive also includes a retention feature that is engageable with a second portion of the drive leader for inhibiting disengagement of the drive leader from the engaging member, wherein the second portion of the drive leader is different than the first portion.

20 Claims, 7 Drawing Sheets

U.S. PATENT DOCUMENTS

| | | | |
|---|---|---|---|
| 4,720,913 A | | 1/1988 | Hertrich |
| 5,261,626 A | * | 11/1993 | Hoge et al. ................. 242/348.2 |
| 5,769,346 A | | 6/1998 | Daly |
| 6,311,915 B1 | | 11/2001 | Rathweg |
| 6,663,034 B1 | * | 12/2003 | Johnson et al. ............ 242/348.2 |
| 2001/0055178 A1 | * | 12/2001 | Stabile et al. ................... 360/94 |
| 2002/0163751 A1 | * | 11/2002 | Chliwnyj et al. .......... 360/73.08 |
| 2006/0231658 A1 | * | 10/2006 | Stamm ......................... 242/338 |

* cited by examiner

LEADER RETENTION METHOD AND DEVICE

CROSS-REFERENCE TO RELATED APPLICATIONS

This application is a continuation-in-part of U.S. application Ser. No. 10/844,844, filed May 13, 2004 now U.S. Pat. No. 7,239,474.

BACKGROUND OF THE INVENTION

1. Field of the Invention

The invention relates to a leader retention method and device for a tape drive.

2. Background Art

In a tape drive having a drive leader connected to a drive reel, and a buckling mechanism for connecting the drive leader to a tape leader of a tape cartridge, a reel locking mechanism may be used to retain the drive leader on the buckling mechanism during shipping or periods of non-use, for example. Such a locking mechanism may inhibit movement of the drive reel so that the drive leader remains engaged with a hook of the buckling mechanism. The locking mechanism must then be disengaged in order to load tape from a tape cartridge into the tape drive, and to perform read/write operations on the tape.

SUMMARY OF THE INVENTION

According to one aspect of the invention, a tape drive for use with a tape cartridge having a cartridge leader is provided. The tape drive includes a drive body, a drive leader that is engageable with the cartridge leader and moveable with respect to the drive body, a guide member supported by the drive body and having a track, and a coupling member that is engageable with the drive leader and moveable along the track of the guide member for connecting the drive leader with the cartridge leader of the tape cartridge. The coupling member has a slot, and the tape drive further includes a drive member having an engaging portion that is configured to be received in the slot of the coupling member. Moreover, the drive member is configured to move the coupling member along the track.

According to another aspect of the invention, a tape drive for use with a tape cartridge having a cartridge leader includes a drive body, and a drive leader that is engageable with the cartridge leader and moveable with respect to the drive body. The tape drive further includes an engaging member that is engageable with a first portion of the drive leader and moveable with respect to the drive body for connecting the drive leader with the cartridge leader of the tape cartridge. The tape drive also includes a retention feature that is engageable with a second portion of the drive leader for inhibiting disengagement of the drive leader from the engaging member, wherein the second portion of the drive leader is different than the first portion.

According to yet another aspect of the invention, a method is provided for retaining a drive leader on a buckling mechanism of a tape drive prior to connecting the drive leader with a cartridge leader of a tape cartridge. The method includes the steps of engaging the buckling mechanism with a first portion of the drive leader; and positioning a retention feature of the buckling mechanism proximate a second portion of the drive leader, the retention feature being configured to inhibit disengagement of the first portion of the drive leader from the buckling mechanism.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
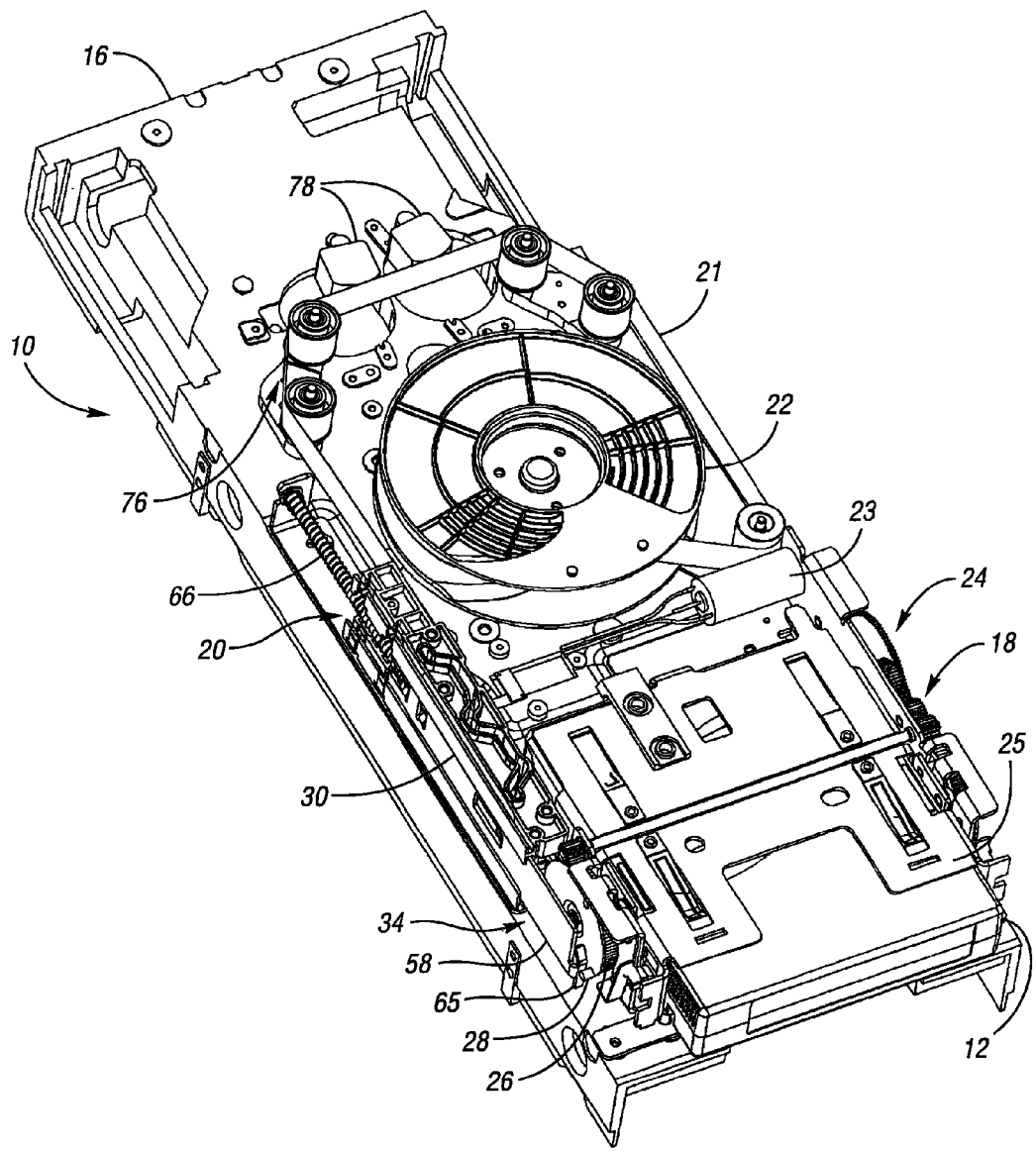
FIG. 1 is a perspective view of a tape cartridge and a tape drive according to the invention.
Figure 2:
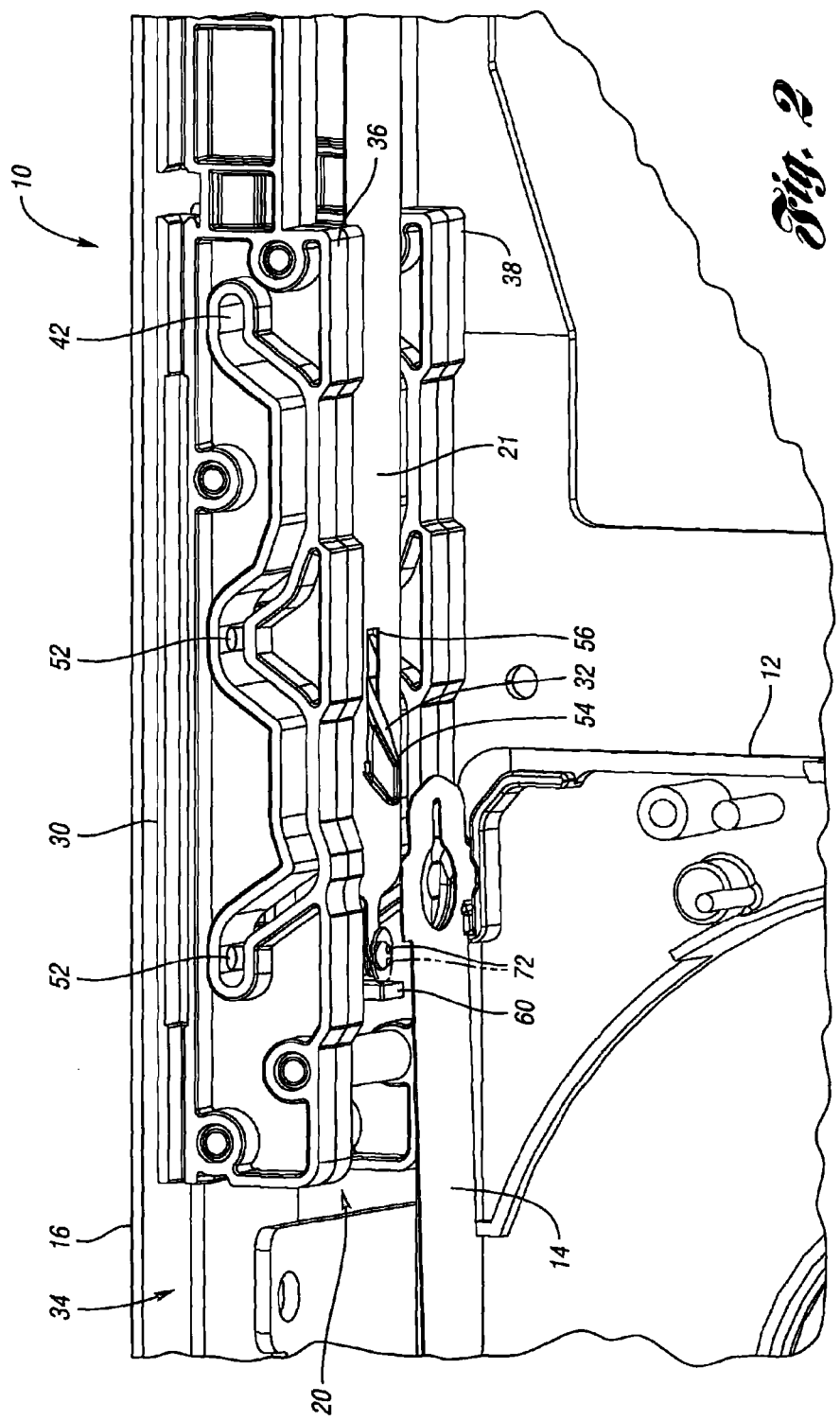
FIG. 2 is a perspective view of a leader connecting mechanism of the tape drive, showing an engaging member of the leader connecting mechanism in an initial position, and a tape leader of the tape drive disengaged from a cartridge leader of the tape cartridge.

FIGS. 1 and 2 show a tape drive 10 according to the invention. The tape drive 10 is configured to receive a tape cartridge 12 having a cartridge leader 14 attached to a length of magnetic tape (not shown). The tape drive 10 is further configured to perform read and/or write operations on the magnetic tape of the tape cartridge 12.

The tape drive 10 includes a drive body, such as a housing 16, for receiving the tape cartridge 12, and an elevator assembly 18 supported by the housing 16 for moving the tape cartridge 12 with respect to the housing 16. The tape drive 10 further includes a leader connecting mechanism 20, such as a buckling mechanism, for connecting a drive leader 21 of the tape drive 10 to the cartridge leader 14, so that the drive leader 21 may route the cartridge leader 14 through the tape drive 10 and to a take-up reel 22, as explained below in detail.

While the elevator assembly 18 may have any suitable configuration, in the embodiment shown in FIG. 1, the elevator assembly 18 includes a motor 23, a gear train 24 connected to the motor 23, and a shuttle 25 associated with the gear train 24 and configured to receive the tape cartridge 12. Furthermore, the elevator assembly 18 is configured to move the tape cartridge 12 with respect to the housing 16. For example, the elevator assembly 18 may be used to raise and/or lower the tape cartridge 12 with respect to the housing 16. More specifically, the gear train 24 may include a gear or cam 26 having a cam slot (not shown) that engages a projection (not shown) on the shuttle 25. Rotation of the cam 26 in a first direction, such as clockwise, may lower the shuttle 25 with respect to the housing 16, and rotation of the cam 26 in an opposite second direction may raise the shuttle 25.

The elevator assembly 18 may also be used to actuate the leader connecting mechanism 20. For example, the cam 26 of the gear train 24 may have an engaging portion, such as a post 28, that is engageable with the leader connecting mechanism 20 for moving a portion of the leader connecting mechanism 20, as explained below in detail.

Figure 3:
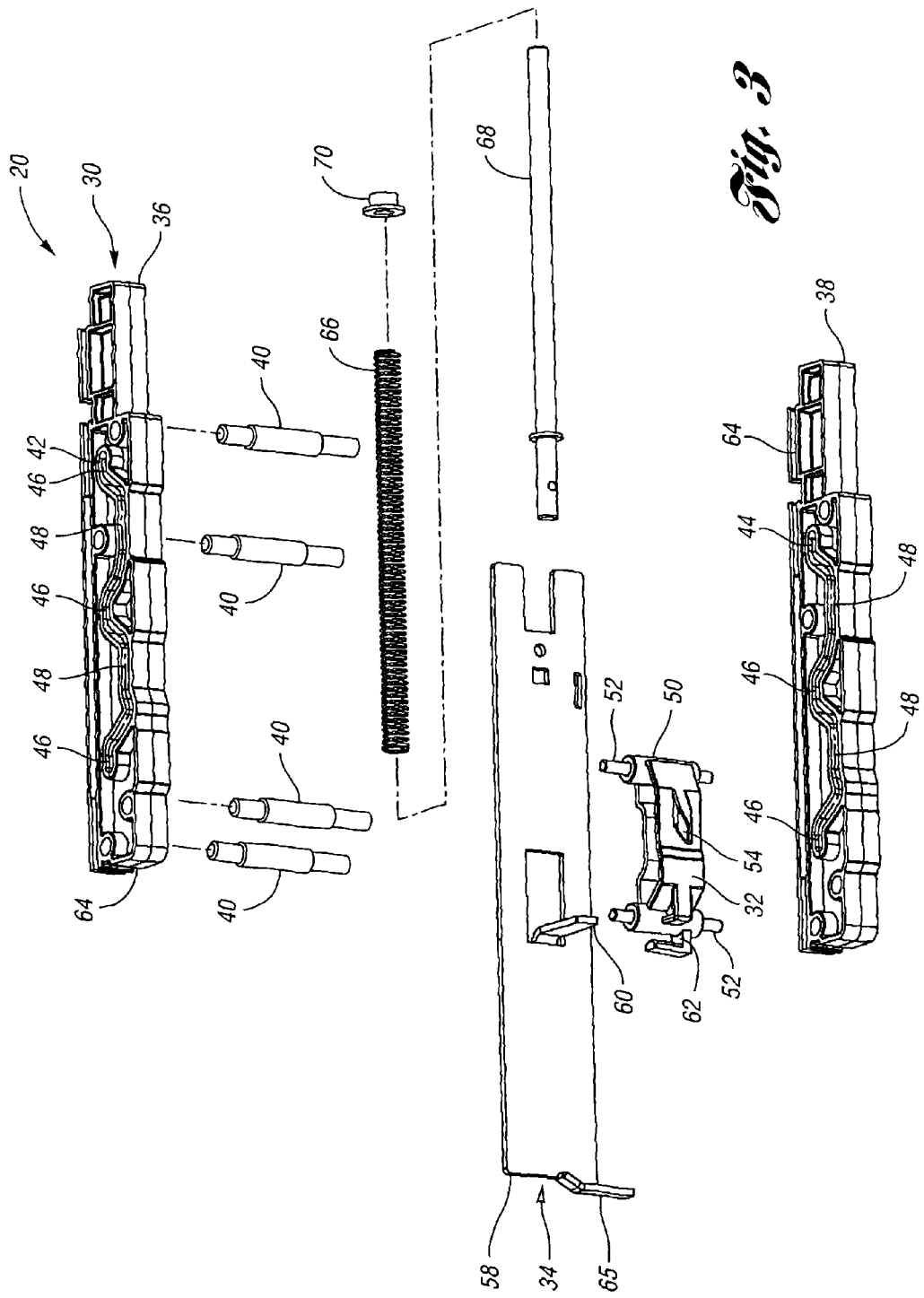
FIG. 3 is an exploded perspective view of the leader connecting mechanism showing the engaging member, a guide member having first and second sections, and a drive arrangement having a drive member with a tab for moving the engaging member along the guide member.

While the leader connecting mechanism 20 may have any suitable configuration, in the embodiment shown in FIGS. 1-3, the leader connecting mechanism 20 includes a guide member 30 supported by the housing 16, a coupling member or engaging member 32 that is engageable with the drive leader 21 and moveable with respect to the guide member 30, and a drive arrangement 34 that is engageable with the engaging member 32. In one embodiment of the invention, the guide member 30 is fixed to the housing 16 in any suitable manner, such as with adhesive and/or fasteners, and includes first and second sections 36 and 38, respectively, that are connected together with fasteners, such as posts 40. The first and second sections 36 and 38, respectively, have first and second guide tracks 42 and 44, respectively, for guiding movement of the engaging member 32. The tracks 42 and 44 are substantially similar and may be configured to vary the angular and lateral orientation of the engaging member 32 as the engaging member 32 translates along the tracks 42 and 44. While the tracks 42 and 44 may have any suitable configuration, in the embodiment shown in FIG. 3, each track 42 and 44 has a non-linear configuration having multiple peaks 46 and valleys 48.

The engaging member 32 may have any suitable configuration such that the engaging member 32 is slidable or otherwise moveable along the tracks 42 and 44. For example, the engaging member 32 may include a main body 50 and one or more projections 52 that extend from the main body 50 and that are engageable with the tracks 42 and 44. The engaging member 32 further includes an engaging portion 54, such as a hook or other projection, that is engageable with the drive leader 21. For example, the engaging portion 54 may be configured to extend into an aperture 56 formed in the drive leader 21 and engage a portion of the drive leader 21 that defines the aperture.

Alternatively, the engaging portion 54 may have any suitable configuration for engaging the drive leader 21. For example, the engaging portion 54 may define an aperture that is configured to receive a projection on the drive leader 21.

The drive arrangement 34 includes a drive member 58 that is engageable with the engaging member 32 for moving the engaging member 32 along the guide member 30. In the embodiment shown in FIG. 3, the drive member 58 includes an engaging portion, such as tab 60, that is configured to be received in a slot 62 of the engaging member 32. The tab 60 may also function as a retention feature for inhibiting disengagement of the drive leader 21 from the engaging member 32, as explained below in detail.

Furthermore, the drive member 58 may be configured to slide along the guide member 30. For example, the drive member 58 may slide along additional guide tracks 64 formed in the guide member 30. While the tracks 64 may have any suitable configuration, in the embodiment shown in the Figures, the tracks 64 are generally linear.

The drive member 58 may be driven in any suitable manner and by any suitable mechanism. In the embodiment shown in the FIG. 1, for example, the drive member 58 is driven by the elevator assembly 18. More specifically, upon rotation of the cam 26, the post 28 of the cam 26 engages a tab 65 on the drive member 58 and urges the drive member 58 along the guide member 30.

As another example, the drive member 58 may be driven by a motor and gear train or other drive assembly (not shown) that are separate from the elevator assembly 18.

In addition, the drive arrangement 34 may include a biasing member, such as a spring 66, for urging the drive member 58 toward a home position shown in FIGS. 1 and 2. Referring to FIGS. 1 and 3, the spring 66 may be positioned on a rod 68 that is attached to the drive member 58 and moveable through a bushing 70, which is attached to the drive body 16.

Referring to FIGS. 1-6, operation of the tape drive 10 will now be described. First, the tape cartridge 12 may be inserted into the tape drive 10 either manually or automatically. Next, the elevator assembly 18 may be used to lower the tape cartridge 12 onto a motor (not shown) of the tape drive 10. Once the tape cartridge 12 is in the lowered position, the elevator assembly 18 may continue to operate, thereby causing the cam 26 to rotate in the first direction into engagement with the drive member 58. Continued rotation of the cam 26 in the first direction causes the drive member 58 to move away from the home position, shown in FIGS. 1 and 2. As a result, the drive member 58 causes the engaging member 32 to move from an initial position, shown in FIG. 2, toward a final position, shown in FIG. 6.

As the engaging member 32 translates toward the final position, the tracks 42 and 44 cause the engaging member 32 to move toward the cartridge leader 14. Upon reaching an intermediate position shown in FIG. 4, the engaging member 32 is configured to position the drive leader 21 for coupling engagement with the cartridge leader 14. For example, the engaging member 32 may be configured to move laterally with respect to the guide member 30, as the engaging member 32 moves toward the intermediate position, to thereby cause a button 72 of the drive leader 21 to extend into an opening 74 of the cartridge leader 14.

Figure 5:
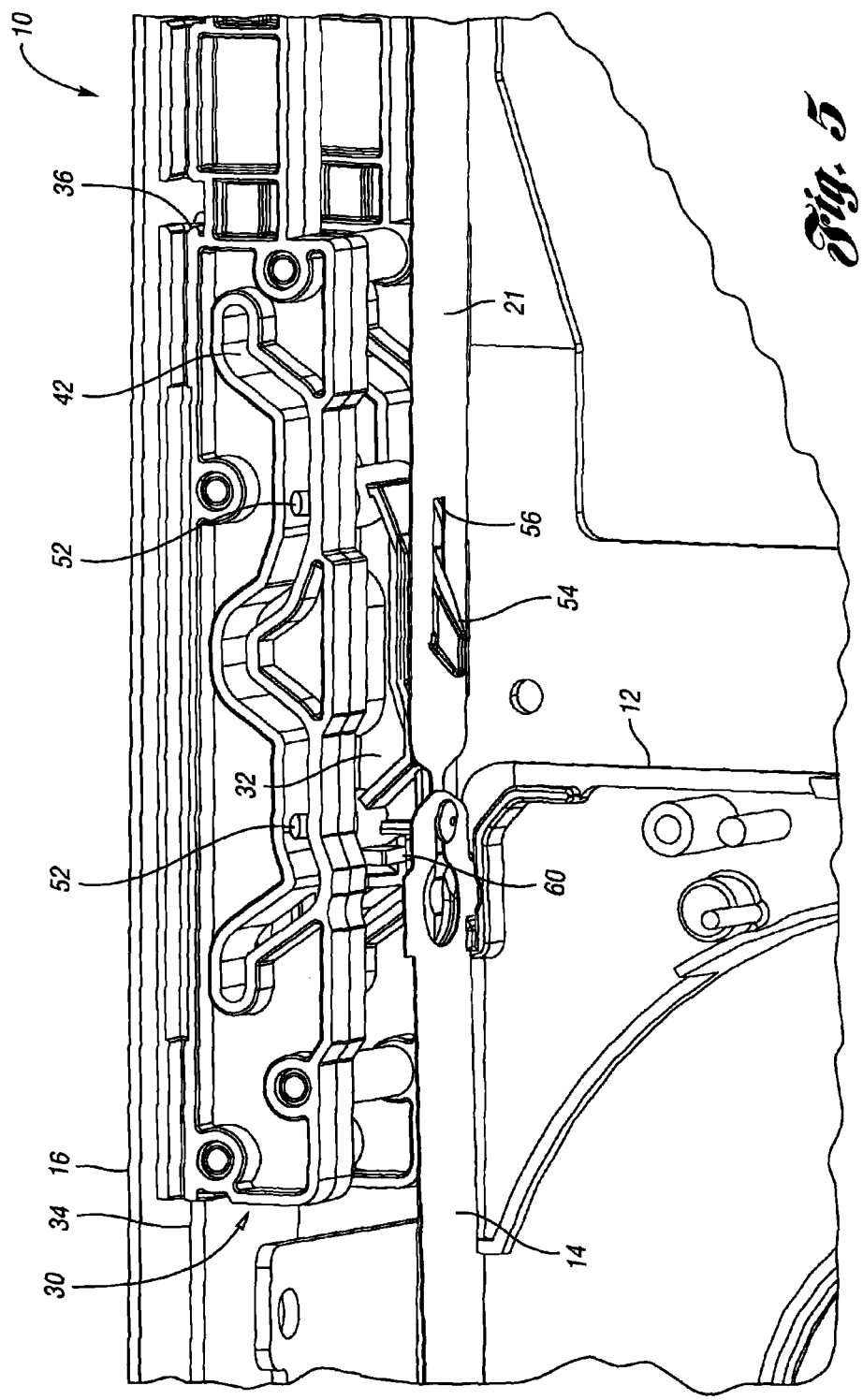
FIG. 5 is a perspective view of the leader connecting mechanism showing the drive leader fully coupled to the tape leader.
Figure 6:
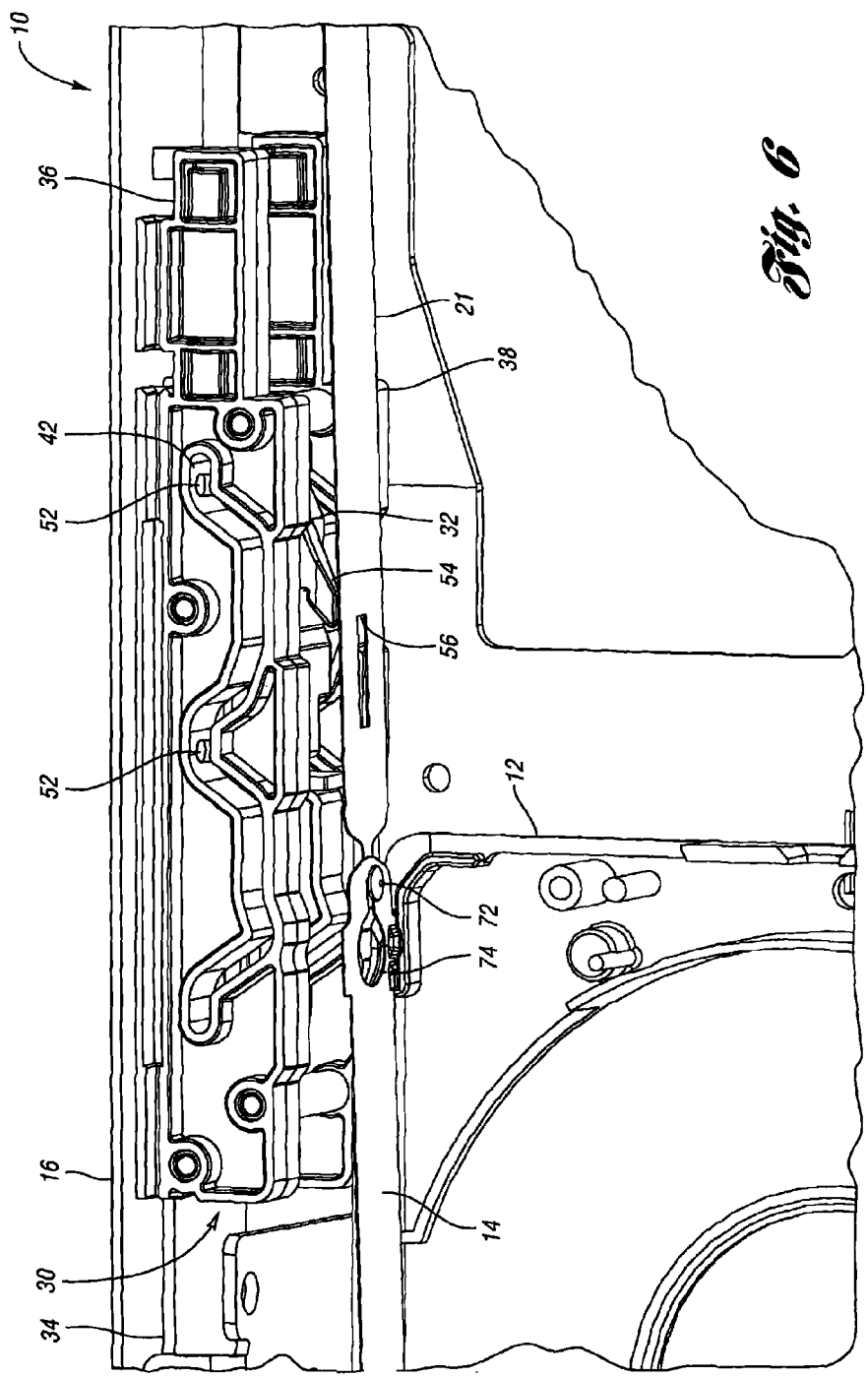
FIG. 6 is a perspective view of the leader connecting mechanism with the engaging member moved to a final position.

Continued movement of the engaging member 32 and drive leader 21 may allow the button 72 to fully engage the opening 74, thereby coupling the drive leader 21 to the cartridge leader 14, as shown in FIG. 5. Further movement of the engaging member 32 toward the final position causes the engaging member 32 to move laterally away from the cartridge leader 14, as shown in FIG. 6. Because the drive leader 21 is now coupled to the cartridge leader 14, this movement of the engaging member 32 also causes the engaging portion 54 to disengage the aperture 56, thereby releasing the drive leader 21 from the engaging member 32.

Alternatively, the leaders 14 and 21 may have any suitable configuration that enables the leaders 14 and 21 to be coupled together. For example, the drive leader 21 may include an opening for receiving a button or other projection of the cartridge leader 14.

Referring to FIG. 1, once coupled to the cartridge leader 14, the drive leader 21 may then be used to route the cartridge leader 14 and magnetic tape (not shown) of the tape cartridge 12 through a tape path 76 to the take-up reel 22 of the tape drive 10. More specifically, the take-up reel 22, which is connected to the drive leader 21, may be rotated to draw the drive leader 21 and cartridge leader 14 through the tape path 76. Next, one or more magnetic heads 78 of the tape drive 10 may be used to perform read and/or write operations on the magnetic tape.

Upon rotation of the cam 26 in the second direction opposite the first direction, the engaging member 32 may return to the initial position shown in FIGS. 1 and 2. As mentioned above, the spring 66 may be used to urge the drive member 58 toward the home position, thereby urging the engaging member 32 toward the initial position.

The initial and final positions of the engaging member 32 may be established in any suitable manner. For example, the initial position may be established by engagement of the rod 68 with one of the posts 40. As another example, the initial position and/or final position may be established by engagement of one of the projections 52 with an end of one of the tracks 42 or 44. As yet another example, one or more sensors may be used to stop movement of the cam 26 when the engaging member 32 has reached a desired position.

With the above configuration, longitudinal, lateral and angular movement of the engaging member 32 may be effectively controlled by the guide member 30. As a result, improved leader connection reliability may be achieved.

Furthermore, the leaders 14 and 21 may have any suitable configuration and may be made of any suitable material. For example, the leaders 14 and 21 may each have a thin, elongated configuration and may be made of a flexible material, such as polyethylene.

Figure 7:
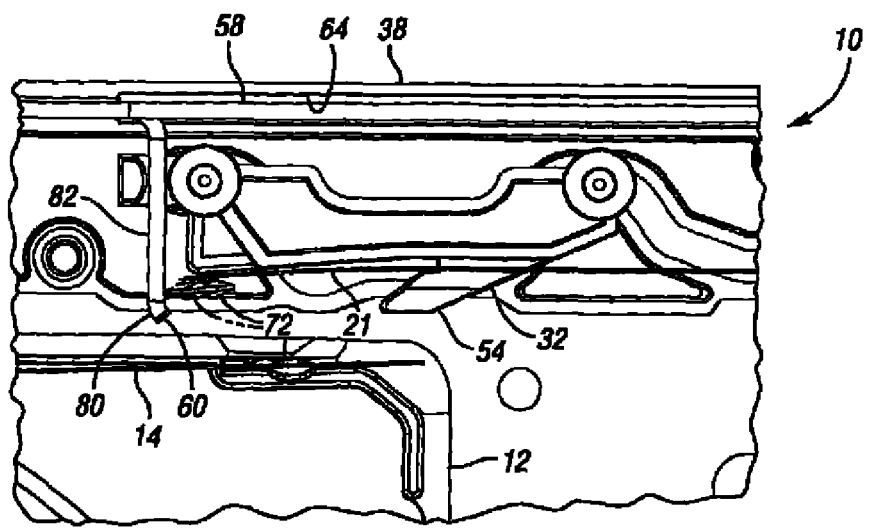
FIG. 7 is a top view of the leader connecting mechanism with a first section of the guide member removed to more clearly show the engaging member and the tab of the drive member, wherein the engaging member is shown in the initial position and the tab is shown with a curved end.

As mentioned above, the tab 60, or other engaging portion of the drive member 58, may function to retain the drive leader 21 on the leader connecting mechanism 20 when the engaging member 32 is in the initial position, shown in FIGS. 2 and 7. More specifically, the tab 60 may inhibit longitudinal movement of the drive leader 21 when the engaging member 32 is in the initial position, thereby inhibiting disengagement of the drive leader 21 from the engaging portion 54 of the engaging member 32. For example, the tab 60 may be positioned adjacent to or otherwise proximate an end of the drive leader 21 when the engaging member 32 is in the initial position, such that the tab 60 inhibits longitudinal movement of the drive leader 21. With such a configuration, the engaging member 32 may be engageable with a first portion of the drive leader 21, and the tab 60 may be engageable with a second portion of the drive leader 21 when the engaging member 32 is in the initial position, such that the tab 60 inhibits disengagement of the first portion of the drive leader 21 from the engaging member 32.

In one embodiment of the invention, the tab 60 may be configured to engage the second portion of the drive leader 21 whenever the engaging member 32 is in the initial position. In another embodiment, the tab 60 may be configured to engage the second portion of the drive leader 21 only when the drive leader 21 moves longitudinally toward the tab 60 (as shown in phantom lines in FIGS. 2 and 7), such as when tension applied by the take-up reel 22 is reduced. In that embodiment, if tension applied by the take-up reel 22 is not reduced, the second portion of the drive leader 21 may remain spaced away from the tab 60 (as shown in solid lines in FIGS. 2 and 7).

In the embodiment shown in FIG. 7, the tab 60 includes an end portion 80 that extends at an angle with respect to a main portion 82, and the end portion 80 further inhibits disengagement of the drive leader 21 from the engaging member 32. More specifically, the end portion 80 inhibits lateral movement of the drive leader 21 with respect to the tab 60 when the engaging member 32 is in the initial position. While the end portion 80 may have any suitable configuration, in the embodiment shown in FIG. 7, the end portion 80 is configured as a curved end.

Figure 4:
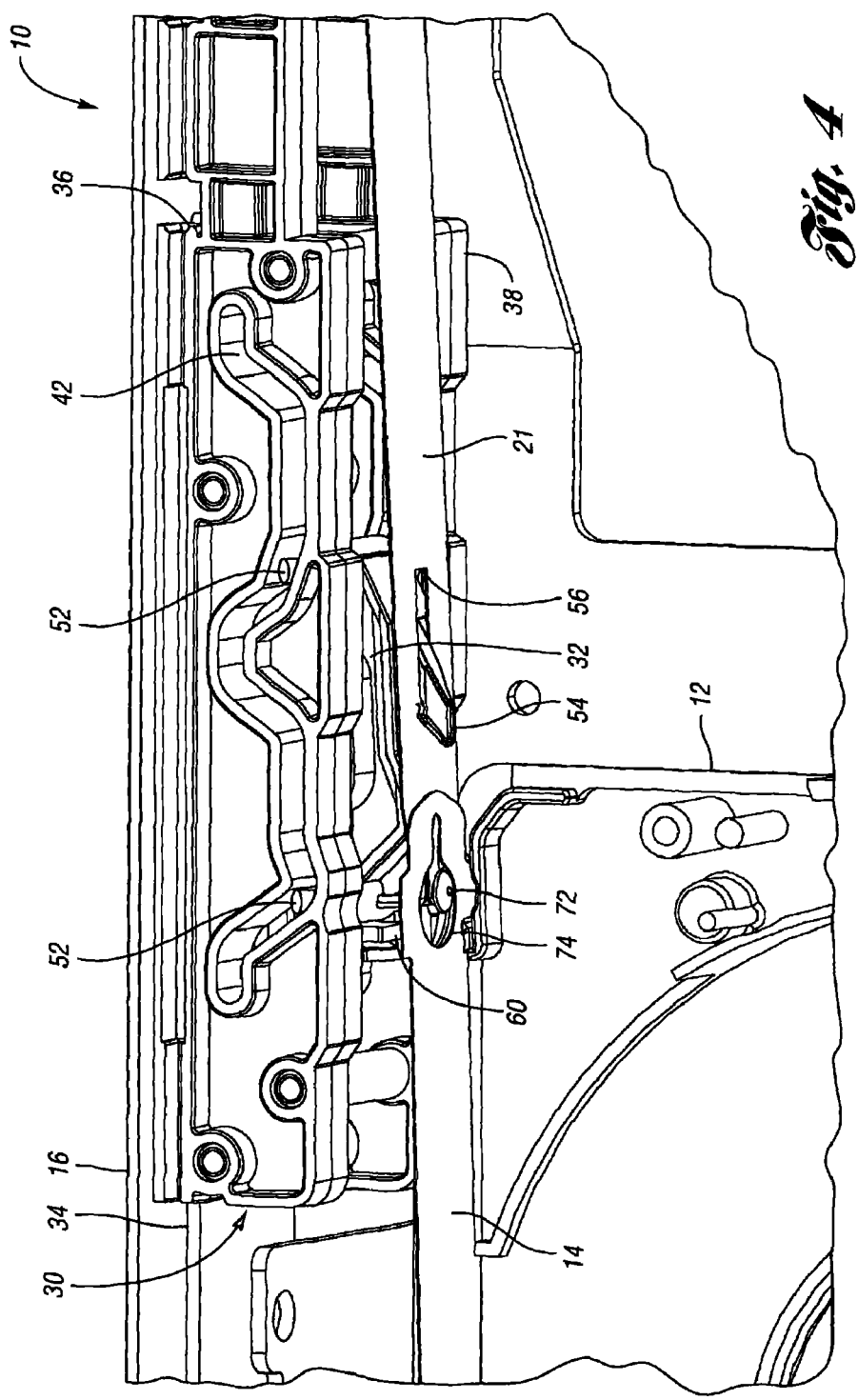
FIG. 4 is a perspective view of the leader connecting mechanism with the engaging member moved to an intermediate position.
Figure 8:
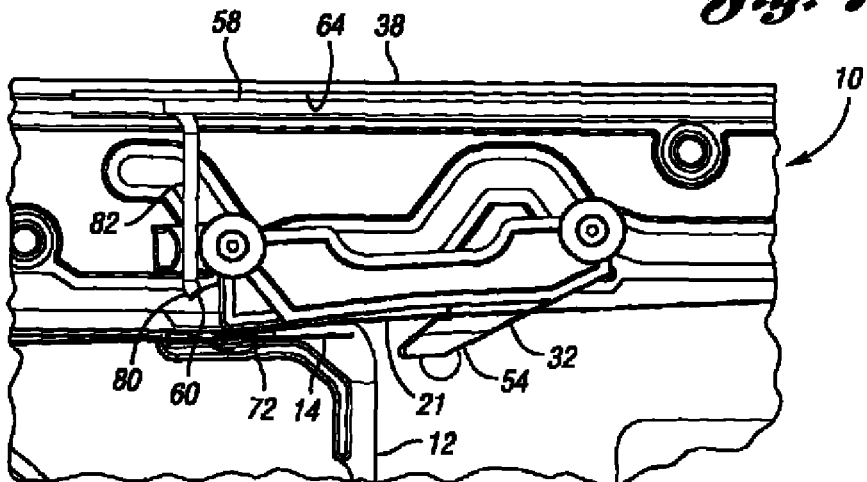
FIG. 8 is a top view similar to FIG. 7, but showing the engaging member in the intermediate position.

When the engaging member 32 moves to the intermediate position shown in FIGS. 4 and 8, the drive leader 21 is spaced laterally away from the tab 60. As a result, upon successful coupling to the cartridge leader 14, the drive leader 21 is able to disengage from the engaging member 32 as the engaging member 32 moves toward the final position shown in FIG. 6.

Figure 9:
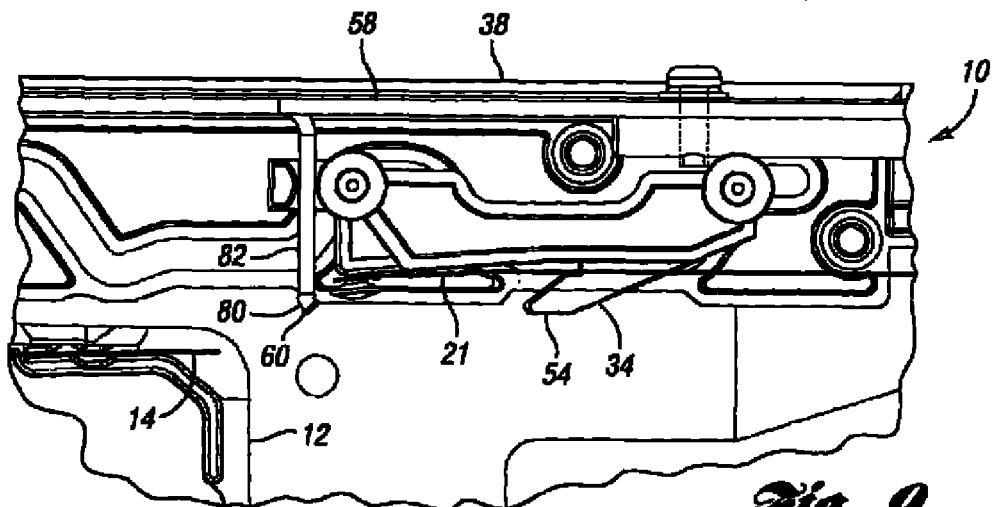
FIG. 9 is a top view similar to FIG. 7, but showing the engaging member in the final position.

If the drive leader 21 does not successfully couple to the cartridge leader 14, then the drive leader 21 may remain engaged with the engaging member 32 as the engaging member 32 moves toward the final position. In such case, referring to FIG. 9, the tab 60 may function to retain the drive leader 21 on the engaging member 32 when the engaging member 32 is in the final position. For example, the tab 60 may be positioned adjacent the second portion of the drive leader 21 when the engaging member 32 is in the final position, and the tab 60 may function in a similar manner as described above with respect to the initial position of the engaging member 32.

With the above configuration, the tab 60 is able to effectively retain the drive leader 21 on the engaging member 32 when the engaging member is in the initial position, while allowing the drive leader 21 to disengage the engaging member 32 upon successfully coupling to the cartridge leader 14. Furthermore, in the event of an unsuccessful coupling, the tab 60 may retain the drive leader 21 on the engaging member 32 when the engaging member 32 is in the final position. As a result, the tab 60 may inhibit disengagement of the drive leader 21 from the engaging member 32 during shipping and/or when tension applied to the drive leader 21 is reduced, for example.

As an alternative, a retention feature similar to tab 60 may be provided at any suitable location on the tape drive 10. For example, a tab or other projection may be fixed to the guide member 30, such that the tab is disposed proximate the end of the drive leader 21 when the engaging member 32 is in the initial position. Such a tab may inhibit disengagement of the drive leader 21 from the engaging member 32 when the engaging member 32 is in the initial position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape drive for use with a tape cartridge having a cartridge leader, the tape drive comprising:
    a drive body;
    a drive leader that is engageable with the cartridge leader and moveable with respect to the drive body;
    a guide member supported by the drive body and having a track;
    a coupling member that is engageable with the drive leader and moveable along the track of the guide member for connecting the drive leader with the cartridge leader of the tape cartridge, the coupling member having a slot; and
    a drive member having an engaging portion that is configured to be received in the slot of the coupling member, the drive member being configured to move the coupling member along the track.

2. The tape drive of claim 1 wherein the engaging portion of the drive member comprises a tab.

3. The tape drive of claim 1 wherein the engaging portion of the drive member is disposed proximate a free end of the drive leader when the drive leader is engaged with the coupling member.

4. The tape drive of claim 1 wherein the engaging portion of the drive member has a curved end.

5. The tape drive of claim 1 wherein the engaging portion of the drive member has a main portion and an end portion that extends at an angle with respect to the main portion.

6. The tape drive of claim 1 wherein the engaging portion of the drive member is engageable with the drive leader for inhibiting disengagement of the drive leader from the coupling member.

7. The tape drive of claim 1 wherein the coupling member is moveable between an initial position and a final position with respect to the guide member, and wherein the engaging portion of the drive member is configured to inhibit disengagement of the drive leader from the coupling member when the coupling member is in the initial position.

8. The tape drive of claim 7 wherein the coupling member is moveable to an intermediate position between the initial and final positions for connecting the drive leader with the cartridge leader, and wherein the engaging portion of the drive member is configured to allow the drive leader to disengage the coupling member as the coupling member moves from the intermediate position toward the final position.

9. The tape drive of claim 1 wherein the coupling member is moveable laterally and longitudinally with respect to the guide member.

10. The tape drive of claim 9 wherein the drive member is moveable generally linearly along the guide member.

11. A tape drive for use with a tape cartridge having a cartridge leader, the tape drive comprising:
    a drive body;
    a drive leader that is engageable with the cartridge leader and moveable with respect to the drive body;
    an engaging member that is engageable with a first portion of the drive leader and moveable with respect to the drive body for connecting the drive leader with the cartridge leader of the tape cartridge; and
    a retention feature that is engageable with a second portion of the drive leader for inhibiting disengagement of the drive leader from the engaging member, wherein the second portion of the drive leader is different than the first portion.

12. The tape drive of claim 11 wherein the engaging member is moveable between an initial position and a final position, and wherein the retention feature is configured to inhibit disengagement of the drive leader from the engaging member when the engaging member is in the initial position.

13. The tape drive of claim 12 wherein the engaging member is moveable to an intermediate position between the initial and final positions for connecting the drive leader with the cartridge leader, and wherein the retention feature is configured to allow the drive leader to disengage the engaging member as the engaging member moves from the intermediate position toward the final position.

14. The tape drive of claim 13 wherein the retention feature is disposed adjacent a free end of the drive leader when the drive leader is engaged with the engaging member and the engaging member is in the initial position.

15. The tape drive of claim 14 wherein the retention feature is spaced laterally away from the free end of the drive leader when the engaging member is in the intermediate position.

16. The tape drive of claim 15 wherein the retention feature has a curved end.

17. The tape drive of claim 15 wherein the retention feature has a main portion and an end portion that extends at an angle with respect to the main portion.

18. A method of retaining a drive leader on a buckling mechanism of a tape drive prior to connecting the drive leader with a cartridge leader of a tape cartridge, the method comprising:
    engaging the buckling mechanism with a first portion of the drive leader; and
    positioning a retention feature of the buckling mechanism proximate a second portion of the drive leader, the retention feature being configured to inhibit disengagement of the first portion of the drive leader from the buckling mechanism.

19. The method of claim 18 wherein the buckling mechanism includes a moveable coupling member and a guide member for guiding movement of the coupling member such that the coupling member is moveable laterally and longitudinally with respect to the guide member, the coupling member being engageable with the first portion of the drive leader.

20. The method of claim 19 further comprising moving the coupling member from a first position in which the retention feature is disposed adjacent the second portion of the drive leader, to a second position in which the retention feature is spaced laterally away from the second portion of the drive leader.

* * * * *